United States Patent

Nii et al.

[11] Patent Number: 5,810,481
[45] Date of Patent: Sep. 22, 1998

[54] OIL RETAINING BEARING UNIT AND MOTOR HAVING OIL RETAINING BEARING UNIT

[75] Inventors: Katsutoshi Nii, Hitachi; Makoto Kondoh, Kashiwa; Takashi Kono; Yoshihiro Sato, both of Chiyoda-machi; Seiichiro Terashima, Minori-machi, all of Japan

[73] Assignees: Hitachi, Ltd., Tokyo; Hitachi Powdered Metals Co., Ltd., Chiba, both of Japan

[21] Appl. No.: 852,246

[22] Filed: May 6, 1997

[30] Foreign Application Priority Data

May 8, 1996 [JP] Japan ................................. 8-113739

[51] Int. Cl.$^6$ .......................... F16C 32/06; F16C 33/10
[52] U.S. Cl. ........................ 384/279; 384/107; 384/133
[58] Field of Search ................................ 384/107, 114, 384/279, 397, 902, 133

[56] References Cited

U.S. PATENT DOCUMENTS

| 2,227,307 | 12/1940 | Hildabolt | 384/279 |
| 3,352,612 | 11/1967 | Eudier | 384/279 |
| 5,120,091 | 6/1992 | Nakagawa | 384/279 |
| 5,145,266 | 9/1992 | Saneshige et al. | 384/279 X |
| 5,645,355 | 7/1997 | Tokushima et al. | 384/133 |

FOREIGN PATENT DOCUMENTS 279961  10/1995  Japan .

Primary Examiner—Thomas R. Hannon
Attorney, Agent, or Firm—Antonelli, Terry, Stout & Kraus, LLP

[57] ABSTRACT

Oil retaining bearing members 2a and 2b for supporting a rotative shaft 1 are arranged in a bearing housing 7 with an interval. The bearing housing 7 has a bottom portion, one end being opened and another end being closed. A porous spacer 3 for supplying a lubrication oil is closely inserted between the oil retaining bearings 2a and 2b. An oil thrower 8 is arranged at an upper portion of the bearing housing 7 and a thrust bearing 5 is arranged at a lower portion. The open end of the bearing housing 7 is arranged on the upper portion and the another end of the bearing housing 7 is arranged on the lower portion of the bearing housing 7, and state a lubrication oil 4a is enclosed in the housing to immerse a part of the porous spacer 3 to some degree. The pore diameter of the porous spacer 3 is larger than that of the oil retaining bearings 2a and 2b. By utilizing capillary tube action in by the porous spacer 3, the lubrication oil 4a is supplied to the oil retaining bearing 2a. Accordingly, an oil retaining bearing unit having an excellent performance and a superior mass productivity and a motor having a long service life and a high reliability using the oil retaining bearing unit can be provided.

25 Claims, 3 Drawing Sheets

Page 1 Column 1

OIL RETAINING BEARING UNIT AND MOTOR HAVING OIL RETAINING BEARING UNIT

BACKGROUND OF THE INVENTION

The present invention relates to an oil retaining bearing unit and a motor having an oil retaining bearing unit, particularly for use in such devices as a compact disc drive apparatus, a magnetic disc drive apparatus and a polygon mirror apparatus.

As a conventional bearing unit for use in an acute rotation compact size motor, such as a CD-ROM apparatus, a magnetic disc drive apparatus, a laser beam printer, a sound and audio apparatus and a picture and video apparatus, a ball bearing structure and a slide bearing structure have been used, and in the slide bearing, air or oil is used as a lubrication agent. Along with a high performance property, a compact size property and a multi-function property, a motor for use in these apparatuses requires a high speed characteristic and a high acute rotation characteristic.

As to the requirement for a high speed characteristic, a following high speed property is desired and a following high acute rotation property is required in all of the above stated motors. For example, a cylinder motor for use in a VTR operates at a required speed of 1,800 rpm to 9,000 rpm, a polygon mirror motor for laser-scanning operates at a speed of several thousands rpm to several tens of thousands rpm, and a disc drive use motor for a CD-ROM apparatus operates at a speed from several hundreds rpm to 10,000 rpm. However, in a case where such high speeds of rotation are required, from a standpoint of the rotation accuracy, it is impossible to use a ball bearing structure; accordingly, a slide bearing structure using oil as the lubrication agent is employed in practice. For example, in the magnetic disc apparatus as shown in Japanese patent laid-open publication No. 279,961/1995, a magnetic drive motor employs a dynamic pressure bearing structure to provide a motor having a high speed characteristic and a high rotation characteristic.

As to the acute rotation of a motor for use in the above stated conventional apparatuses, in addition to a high speed characteristic and a shaft run out accuracy characteristic, in order to operate in a clean environment condition, a bearing unit having a superior sealing performance is required. Further, with regard to this type motor, since a bearing structure having a low cost and a superior mass production characteristic is required, up to now various devices have been developed.

With respect to provision of a high speed characteristic, as the bearing structure of the motor, a groove bearing has been proposed, which groove bearing has a shallow groove for generating dynamic pressure formed on the rotative shaft of the motor. This groove bearing structure, which has been used in some technical fields, has superior characteristics in high speed operation and also in the shaft run out accuracy etc. However, since the dynamic pressure generation groove in such a groove bearing is formed according to an etching processing, which is a lengthy process, there are problems with respect to the high cost of manufacture of the groove bearing and the low mass production for manufacturing and producing the groove bearing.

Further, in a case where oil is used as a lubricating agent for lubricating the bearing, some means to prevent oil leakage is required. Accordingly, a bearing unit in which a magnetic fluid is used for the lubrication and sealing of the bearing has been proposed. For example, in the above stated Japanese patent laid-open publication No. 279,961/1995, in a magnetic fluid bearing having a sealing function, a bearing unit and a motor for driving a magnetic disc having the bearing unit are disclosed. The groove bearing has a dynamic pressure generation groove on a rotative shaft, which dynamic pressure generation groove is effective to obtain a high speed characteristic and the required shaft run out accuracy. However, in the bearing unit shown in Japanese patent laid-open publication No. 279,961/1995, since the magnetic fluid completely fills the bearing unit, under conditions where the temperature rises, there is a fear that the magnetic fluid will flow out of the bearing unit as the volume of magnetic fluid expands. Further, to provide a low cost of manufacture of the bearing structure, a method for simply processing the groove in the groove bearing has been proposed, however since a groove bearing having a shallow groove for generating a dynamic pressure is required to have an extremely expansive process accuracy, a satisfactory reduction in the cost of manufacture is difficult to attain.

In addition to the above stated methods, an oil retaining bearing has been proposed for the mass-production of a compact size motor. This oil retaining bearing is a slide bearing structure having a superior mass production capability and a low cost of manufacture characteristic. However, with only oil being impregnated into the bearing, since effective fluid lubrication can not be expected, this oil retaining bearing typically is not employed in a motor in which a high speed characteristic and a high rotation accuracy are required. Further, such an oil retaining bearing should necessarily have a tight sealing characteristic if it is to be used as a high accuracy rotation motor.

SUMMARY OF THE INVENTION

An object of the present invention is to provide an oil retaining bearing unit and a motor having an oil retaining bearing unit, wherein the bearing unit has a high speed characteristic, a superior sealing performance and a superior mass production characteristic.

Another object of the present invention is to provide an oil retaining bearing unit and a motor having an oil retaining bearing unit, wherein the motor has a high reliability characteristic.

According to the present invention, an oil retaining bearing unit comprises a rotative shaft, a bearing housing, a first oil retaining bearing member positioned at an upper portion of the bearing housing for rotatively supporting the rotative shaft in the bearing housing, a second oil retaining bearing member positioned at a lower portion of the bearing housing for rotatively supporting the rotative shaft in the bearing housing, the first oil retaining bearing member and the second oil retaining bearing member being arranged with an interval therebetween, a porous spacer inserted closely between the first oil retaining bearing member and the second oil retaining bearing member for supplying lubrication oil, and lubrication oil enclosed in the bearing housing in an amount sufficient to contact the porous spacer.

According to the present invention, an oil retaining bearing unit comprises a rotative shaft, a bearing housing, a first oil retaining bearing member positioned at an upper portion of the bearing housing for rotatively supporting the rotative shaft in the bearing housing, a second oil retaining bearing member positioned at an lower portion of the bearing housing for rotatively supporting the rotative shaft in the bearing housing, the first oil retaining bearing member and the second oil retaining bearing member being arranged with an interval therebetween, a porous spacer inserted closely between the first oil retaining bearing member and the second oil retaining bearing member for supplying magnetic fluid, a ring-shaped permanent magnet arranged above the first oil retaining bearing member, and magnetic fluid enclosed in the bearing housing in an amount sufficient to contact the porous spacer.

The above stated oil retaining bearing unit is employed for use as a bearing unit in a compact disc drive motor, as a bearing unit in a magnetic disc drive motor, and as a bearing unit in a polygon mirror motor, etc.

DESCRIPTION OF THE INVENTION

Hereinafter, one embodiment of an oil retaining bearing unit according to the present invention and a motor having an oil retaining bearing unit according to the present invention will be explained with reference to the drawings.

Figure 1:
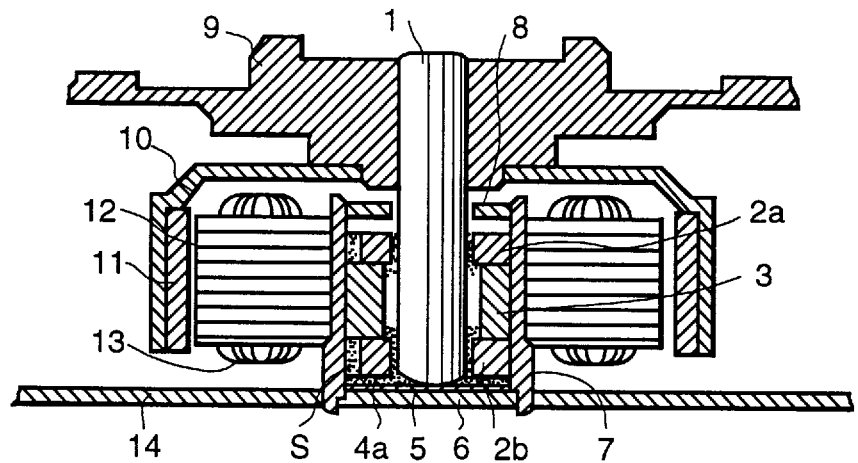
FIG. 1 is a longitudinal cross-sectional view showing a compact disc (CD) drive motor used in a CD-ROM apparatus in which there is provided one embodiment of an oil retaining bearing unit according to the present invention.

FIG. 1 is a longitudinal cross-sectional view showing a compact disc (CD) drive motor used in a CD-ROM apparatus in which there is provided one embodiment of an oil retaining bearing unit according to the present invention.

In FIG. 1, the oil retaining bearing unit comprises a rotative shaft 1 having one end disposed in a housing 7, two oil retaining bearing members 2a and 2b, including an upper oil retaining bearing member 2a positioned at an upper portion of the housing 7 and a lower oil retaining bearing member 2b at a lower portion of the housing 7, a porous spacer 3 arranged between the upper oil retaining bearing member 2a and the lower oil retaining bearing member 2b, lubrication oil 4a, a thrust bearing 5 and a lid 6 closing one end of the housing 7, the other end of which carries an oil thrower 8.

The drive motor further comprises a compact disc (CD) holder 9 mounted on the other end of the shaft 1, a rotor casing 10 secured to the holder 9, a motor multi-pole magnetized rotor 11 carried by the rotor casing 10, a motor stator 12, the multi-pole magnetized rotor 11 being arranged so as to oppose the motor stator 12, a coil 13 mounted on the motor stator 12 for generating a magnetic field, and a motor base member 14 on which the bearing unit is mounted.

In the above stated bearing unit, the bearing housing 7 has a bottom portion closed by the lid 6, and the other upper end of the bearing housing 7 is open. The oil thrower 8, the two upper and lower oil retaining bearing members 2a and 2b and the porous spacer 3 are arranged concentrically on shaft 1 in the bearing housing 7.

A suitable amount of lubrication oil 4a is enclosed in the bearing housing 7. The motor stator 12 and the magnetic field generation coil 13 are arranged on the bearing housing 7, which is supported on the base member 14.

A rotative member in this embodiment of the bearing unit according to the present invention is constituted by the motor rotor 11 and the rotor casing 10, CD holder 9 and the rotative shaft 1. The motor rotor 11 is arranged to oppose the motor stator 12, while the rotative shaft 1 is supported rotatively by the upper and lower oil retaining bearings 2a and 2b.

Figure 2:
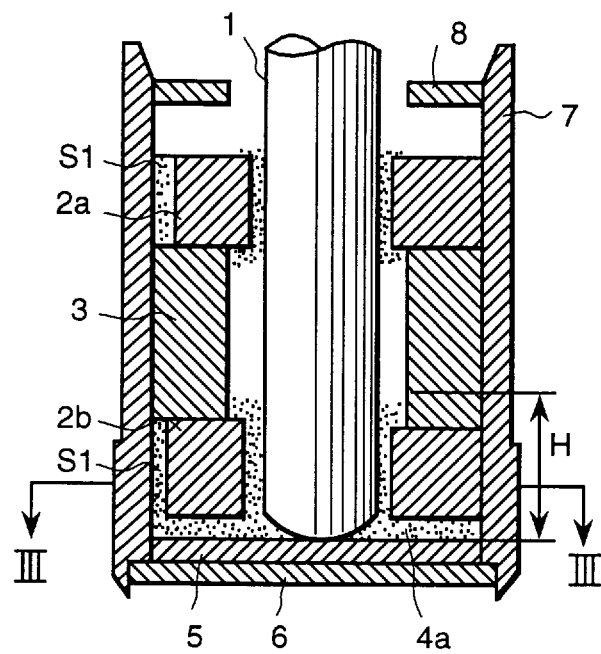
FIG. 2 is a longitudinal cross-sectional view showing details of the oil retaining bearing unit according to the present invention.

Herein, one embodiment of the bearing unit according to the present invention will be explained more detail. FIG. 2 is a longitudinal cross-sectional view showing the oil retaining bearing unit according to the present invention in more detail.

The oil thrower 8 is provided on the upper open end of the bearing housing 7. Next, with a suitable interval, the upper oil retaining bearing member 2a and the porous spacer 3 and the lower oil retaining bearing member 2b are arranged in the bearing housing 7. The porous spacer 3 is positioned in close contact with the upper oil retaining bearing member 2a and this porous spacer 3 has a pore diameter size which is larger than the pore diameter size of the upper oil retaining bearing member 2a and larger than the pore diameter size of the lower oil retaining bearing member 2b. Further, the thrust bearing 5 and the lid 6 are arranged at the bottom of the bearing housing 7.

The lubrication oil 4a is provided in the housing 7 to a vertical height H measured from the upper surface of the thrust bearing 5 so as to immerse and impregnate the lower oil retaining bearing member 2b and only a part of the porous spacer 3 to some degree. In contact, in a conventional bearing unit having an oil retaining bearing member, a smooth rotation is obtained only when the oil retaining bearing member is immersed in lubrication oil. However, in a case of high speed rotation exceeding several thousands of rotations per minute, the lubrication oil in which the oil retaining bearing member is immersed tends to be thrown out of the housing, so that a smooth rotation in the bearing unit can not be attained. As a result, abrasion of the bearing in the bearing unit may occur.

For the above stated reasons, in this embodiment of the bearing unit according to the present invention, as shown in FIG. 2, only sufficient lubrication oil 4a is enclosed in the housing 7 to reach the position H from the upper of the thrust bearing 5 so as to immerse and impregnate the lower oil retaining bearing member and only enough of the porous spacer 3 to provide lubricating oil thereto. As a result, in this embodiment of the present invention, since the thrust bearing 5 and the lower oil retaining bearing member 2b are always immersed in the lubrication oil 4a, abrasion of the bearing does not occur. Also, the oil throw phenomenon in the bearing unit does not occur because the housing 7 is not filled with lubrication oil.

Further, in the upper oil retaining bearing member 2a, an insufficiency of oil may occur during high speed rotation; however, since the porous spacer 3 having a larger pore diameter size than the pore diameter size of the upper oil retaining bearing member 2a and a larger pore diameter size than that of the lower oil retaining bearing member 2b is provided in the bearing unit, the lubrication oil 4a can be supplied to the upper oil retaining bearing member 2a according to capillary tube action by way of the porous spacer 3.

Accordingly, in this embodiment according to the present invention, even during high speed rotation, the rotative shaft 1 can be supported properly for smooth rotation with proper and adequate fluid lubrication. The above stated oil supply mechanism in the oil retaining bearing unit can utilize the characteristic of capillary tube action between the porous material members whereby fluid transfers from a body having the larger pore diameter size to a body having the smaller pore diameter size.

Figure 3:
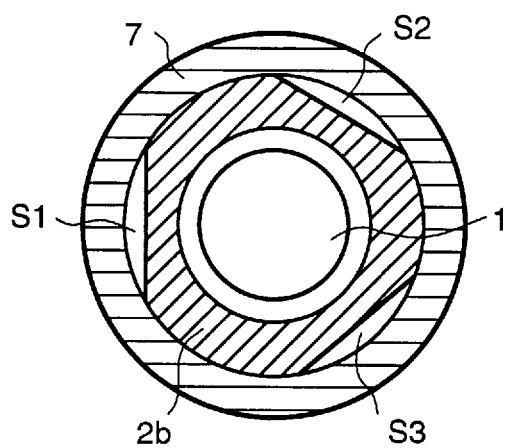
FIG. 3 is a cross-sectional view showing the oil retaining bearing unit taken along line III—III of FIG. 2.

Further, in this embodiment of the present invention, as shown in FIG. 2 and FIG. 3, to more easily supply the lubrication oil 4a to the porous spacer 3, three passages S1, S2 and S3 are provided on an outer peripheral portion of each of the upper oil retaining bearing member 2a and the lower oil retaining bearing member 2b. These passages S1, S2 and S3 are formed with the same cross-sectional area and are effective to increase the upward flow of the lubrication oil 4a to the porous spacer 3. In the upper bearing member 2a, the passages S1, S2 and S3 operate to return the lubrication oil 4a, which flows over the top of the upper oil retaining bearing member 2a, to the porous spacer 3.

Accordingly, in this embodiment of the present invention, even in a case where the lubrication oil 4a is volumetrically expanded by a temperature rise during high speed rotation, due to the limited amount of lubrication oil 4a enclosed in the housing 7, there will be sufficient space in the housing to absorb the volumetric expansion. Therefore, even in a case where the lubrication oil 4a flows out over the upper oil retaining bearing member 2a, since the passages S1, S2 and S3 are provided between the upper oil retaining bearing member 2a and the bearing housing 7, the lubrication oil 4a can be retained and absorbed by the porous spacer 3, and thereby the lubrication oil 4a does not leak toward the outside of the bearing housing 7 and lubrication of the upper oil retaining bearing member 2a is enhanced.

Further, since the thrust bearing 5 is always immersed in the lubrication oil 4a, proper lubrication is always carried out, and the throwing out of oil from the oil retaining bearing unit does not occur, thereby avoiding abrasion in the oil retaining bearing unit.

Herein, in this embodiment of the oil retaining bearing unit, the three passages S1, S2 and S3 are provided on each of the upper oil retaining bearing member 2a and the lower oil retaining bearing member 2b, however the bearing members can be formed to have a single passage or two passages, or the number of passages may exceed three passages.

As to the rotation accuracy, as shown in FIG. 3, the peripheral face of the upper oil retaining bearing member 2a and the peripheral face of the lower oil retaining bearing member 2b essentially form a three lobe shape. Namely, the peripheral face of the upper oil retaining bearing member 2a forms a non-circular shaped dynamic pressure type bearing member, and the peripheral face of the lower oil retaining bearing member 2b also forms a non-circular shaped dynamic pressure type bearing member. By utilizing a notch effect according to the oil film, a dynamic pressure is generated on the bearing sliding face, thereby the rotative shaft 1 can be supported accurately.

Figure 4:
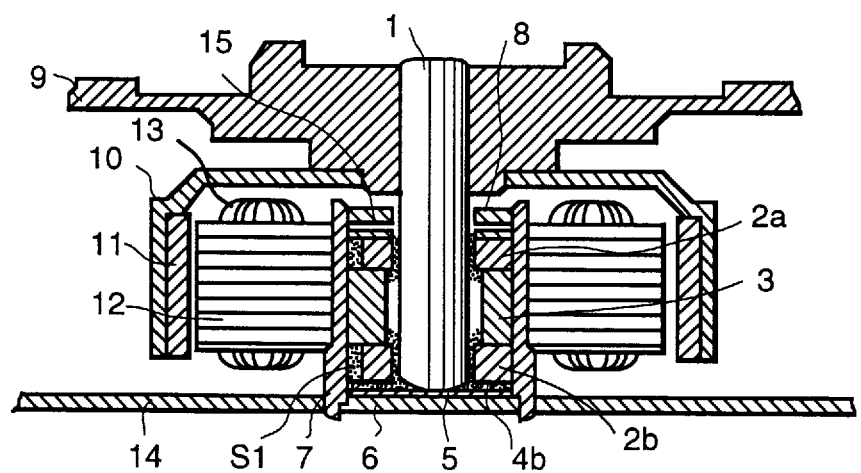
FIG. 4 is a longitudinal cross-sectional view showing a compact disc (CD) drive motor used in a CD-ROM apparatus in which there is provided another embodiment of an oil retaining bearing unit according to the present invention.

Further, to reduce the abrasion torque, the thrust bearing 5 is constituted with a pivot bearing structure on which a tip end of the rotative shaft 1, having a spherical shape, is supported, as shown in FIG. 1, FIG. 2 and FIG. 4. The thrust bearing 5 is made of a resin material having a low friction coefficient, for example, a sliding material, such as polyethylene, polytetra-fluoroethylene, polycarbonate, and polyimide, etc.

Accordingly, a motor having an oil retaining bearing unit according to the present invention has a good activation characteristic, and even a case where the motor rotates at the high speed, a smooth rotation can be obtained. Further, since there is no oil leakage and there is no possibility of abrasion in the oil retaining bearing unit, a motor having a long service life and a high reliability characteristic, capable of operating with a high accuracy of rotation, can be obtained.

The above stated oil retaining bearing unit is assembled in the following manner, for example. First, the lower oil retaining bearing member 2b, the porous spacer 3, and the upper oil retaining bearing member 2a are arranged on a guide pin in sequential order. The guide pin as a first jig member is mounted on a base, and this guide pin has the same diameter as the rotative shaft 1.

Next, a second jig member is mounted on the bearing housing 7. The second jig member comprises a cylindrical portion and an inner projection portion. The peripheral face of the cylindrical portion of the second jig member has the same shape as an outer peripheral face of the bearing housing 7 and the inner projection portion of the second jig member projects the housing 7 toward the inside lower portion from an upper portion of the cylindrical portion of the second jig member.

By mounting the second jig member on the bearing housing 7 from an upper side, the inner projection portion of the second jig member is brought to a position where it will contact an upper face of the upper oil retaining bearing member 2a, and while maintaining this positioning, the first jig member and the second jig member are pressed together at the same time from an upper and lower direction using a pressing machine. Therefore, each of the respective components is placed under pressure causing the oil retaining bearing unit structure consisting of the bearing members 2a and 2b and the porous member 3 to be inserted into the bearing housing 7.

At this time, since the shape accuracy and the inner diameter accuracy of the bearing is obtained with $\mu$m order accuracy, a machining process is not required in particular. Next, the thrust bearing 5 and the oil throw 8 are inserted under pressure at the same time, therefore the oil retaining bearing unit is assembled. After that a regulated amount of lubrication oil 4a is introduced into the housing 7 in a final process of assembling the motor.

As can be seen, the oil retaining bearing unit according to the present invention can be automatically assembled, so that the cost of manufacture is low and the bearing unit has a structure suitable for mass production.

The above stated operations and effects in the bearing unit were confirmed according to experiments performed by the inventors, employing a motor running at 4,000 rpm and having a rotative shaft 1 with a diameter of 3 mm. As a result of these experiments, it was found that, in the conventional bearing unit where no lubrication oil is enclosed in the bearing unit, but the lubrication oil is impregnated only in the oil retaining bearing member, during an initial period for reaching 4,000 rpm, rotation foreign noises (rotation different sounds) and abrasion in the bearing unit were found to occur as a result of the oil throw phenomenon. However, in the motor having the oil retaining bearing unit according to the present invention, the motor was observed to operate with a smooth rotation even after the period for reaching 4,000 rpm. As a result, the effect of enclosing the lubrication oil 4a and the operations of the porous spacer 3 to achieve a more desirable bearing structure were confirmed.

Further, in use, a compact disc (CD) is mounted on a compact disc holder (CD holder) with an interval having the length of 0.1 mm. In addition to the above, at an end user side, a labeling is attached to the compact disc (CD), and so there is a possibility that an unbalance occurring during the rotation of the disc may become large. As a result, there is a possibility of abrasion occurring in the oil retaining bearing member, because the load amount increases according to the centrifugal force as the high speed of rotation increases.

To effectively employ this embodiment of the oil retaining bearing unit according to the present invention under such circumstances, results of experimentation as to the relationship between the abrasion of the oil retaining bearing unit structure and the viscosity of the lubrication oil 4a by the inventors show that, by using a lubrication oil 4a having a viscosity of 80–120 centipoise at 40° C., the bearing member is not worn away, and further, such a lubrication oil 4a does not have as undesirable an effect on the temperature rise.

FIG. 4 is a longitudinal cross-sectional view showing a compact disc (CD) drive motor used in a CD-ROM apparatus in which there is provided another embodiment of an oil retaining bearing unit according to the present invention. Since the embodiment shown in FIG. 4 has basically the same motor structure as the embodiment shown in FIG. 1, an explanation of the motor structure will be omitted.

The main difference in the bearing structure resides in the use of a ring-shaped permanent magnet 15 arranged in close contact with and adhering to the surface of the upper oil retaining bearing member 2a and the use of a magnetic fluid 4b as the lubrication oil. The permanent magnet 15 is magnetized with an N-pole and an S-pole at an upper and lower direction around the entire peripheral portion of the permanent magnet 15. The magnet fluid 4b comprises a mixture in which a material of fine magnetic powders covered by a surface active agent is mixed with the oil.

Figure 5:
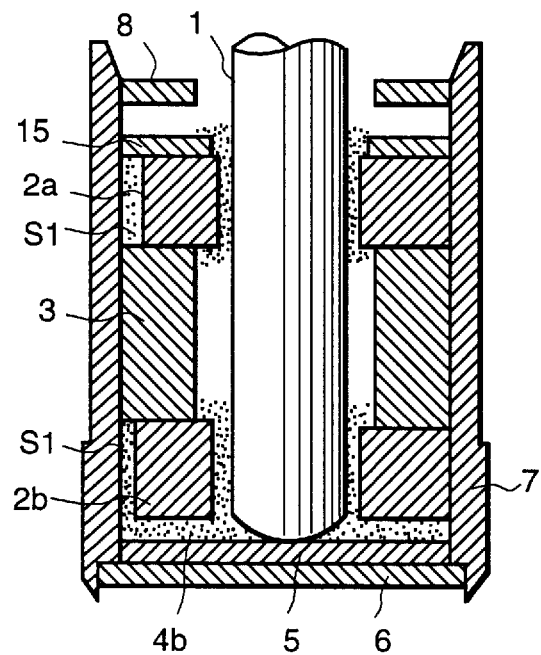
FIG. 5 is a longitudinal cross-sectional view showing details of the oil retaining bearing unit according to the present invention.

FIG. 5 is a longitudinal cross-sectional view showing details of the oil retaining bearing unit according to FIG. 4. Herein, different functional structures in FIG. 5 will be compared with the bearing unit shown in FIG. 2.

In the oil retaining bearing unit structure shown in FIG. 5, the rotative shaft 1 is constituted by a high permeability material, such as SUS420J2. The rotative shaft 1 can be magnetized by the ring-shaped permanent magnet 15. However, the bearing housing 7 is constituted by a non-magnetic material and is not magnetized by the ring-shaped permanent magnet 15. With this oil retaining bearing unit structure, since the ring-shaped permanent magnet 15 is arranged on the upper oil retaining bearing member 2a, both the rotative shaft 1 and the magnetic fluid 4a can be magnetized.

In the bearing unit structure shown in FIG. 2, the lubrication oil 4a is supplied to the upper oil retaining bearing member 2a primarily by capillary tube action. On the other hand, in the oil retaining bearing unit according to the present invention, as shown in FIG. 5, in addition to capillary tube action, since the magnetic fluid 4b is drawn up to the upper oil retaining bearing member 2a by the magnetic absorption force produced by the permanent magnet 15, the oil supply to the upper oil retaining bearing member 2a can be effected more surely.

Further, since the rotative shaft 1 is magnetized, the magnetic fluid 4b adheres always to the surface of the rotative shaft 1, so that the oil film can surely form even at a time when the motor is stopping or stopped. Therefore, the rotative shaft 1 perform consistently under a smooth rotation condition.

For the magnetic fluid 4b used in this embodiment of the oil retaining bearing unit according to the present invention, there is employed a magnetic fluid 4b having a viscosity similar to the viscosity of the lubrication oil 4a shown in the oil retaining bearing unit in the embodiment shown in FIG. 2, that is, it was found to be preferable to employ a magnetic fluid 4a having a viscosity of 80–120 centipoise at 40° C.

In the above stated embodiments according to the present invention, the oil retaining bearing unit is installed with an upright orientation, but the oil retaining bearing unit can be installed with a lateral orientation as well. More particularly, in the oil retaining bearing unit shown in FIG. 5, the magnetic fluid 4b is magnetized by the ring-shaped permanent magnet 15. Accordingly, the ring-shaped permanent magnet 15 supplies the magnetic fluid 4b to the upper oil retaining bearing member 2a and also performs a shaft sealing operation on the rotative shaft 1. Thereby, even in a case where the motor is installed with a lateral orientation, the magnetic fluid 4b does not flow out of the bearing unit.

Further, the materials for the upper oil retaining bearing member 2a and the lower oil retaining bearing member 2b can be selected in accordance with the conditions of use of the motor. In the oil retaining bearing unit structure shown in FIG. 5, as the materials for the upper oil retaining bearing member 2a and the lower oil retaining bearing member 2b, a Fe system oil retaining bearing member can be used. In this case, since the upper oil retaining bearing member 2a is directly magnetized by the ring-shaped permanent magnet 15, the maintenance of the magnetic fluid 4b and the magnetic fluid supply at the bearing sliding face can be carried out surely. More specifically, as the materials for the upper oil retaining bearing member 2a and the lower oil retaining bearing member 2b, it is preferable to employ a Fe—Cu system oil retaining bearing member, which has a bearing familiarity characteristic, such as a component consisting of about 50% Fe–50% Cu.

With regard to the viscosity of the lubrication oil 4a and the viscosity of the magnetic fluid 4b, in cases of a magnetic disc drive spindle motor and the polygon mirror motor, the temperature rise is regarded as important. According to a result of experiments performed by the inventors, to lessen the bearing loss, it was found to be preferable to use a lubrication oil 4a and a magnetic fluid 4b having a viscosity of less than 50 centipoise at 25° C.

Figure 6:
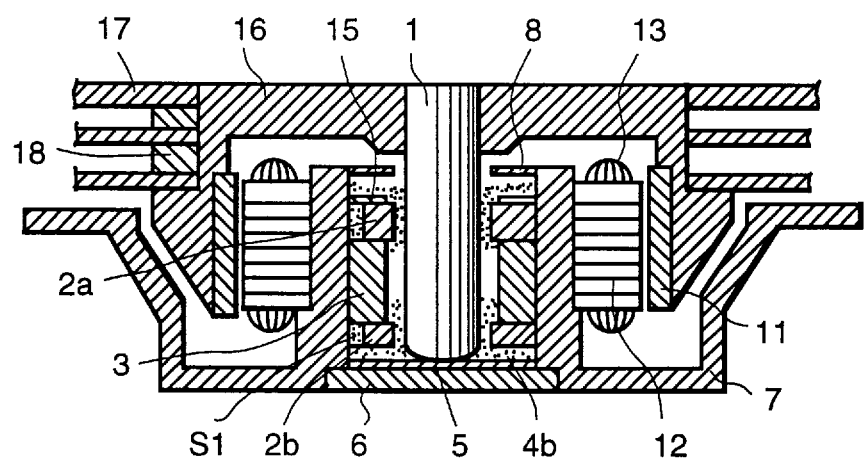
FIG. 6 is a longitudinal cross-sectional view showing a magnetic disc drive spindle motor used in a magnetic disc apparatus in which there is provided a further embodiment of an oil retaining bearing unit according to the present invention.

FIG. 6 is a longitudinal cross-sectional view showing a magnetic disc drive spindle motor used in a magnetic disc apparatus in which there is provided a further embodiment of an oil retaining bearing unit according to the present invention. Since the embodiment shown in FIG. 6 has basically the same structural elements as the embodiment shown in FIG. 4, an explanation of the motor structure and the operations and effects of the motor shown in FIG. 6 will be omitted.

In the magnetic disc drive spindle motor structure, as shown in FIG. 7, magnetic discs 17 are mounted on a hub 16 using a spacer ring 18 to provide an interval therebetween. The rotative shaft 1 is fixed to the hub 16 and is supported rotatively by the bearing unit. In particular, in this magnetic disc drive apparatus, when the rotative shaft 1 and the upper oil retaining bearing member 2a and the lower oil retaining bearing member 2b contact each other, in addition to the rotation component relating to shaft run out, an irregular asymmetric component occurs, thereby creating problems which affect the information write-in and read-out.

In the above stated magnetic disc drive spindle motor structure having the oil retaining bearing unit according to the present invention, an oil film is formed on the bearing sliding face immediately after the activation of the motor, the rotative shaft 1 and the upper oil retaining bearing member 2a and the lower oil retaining bearing member 2b do not come into contact with each other. Accordingly, a high accuracy of rotation can be maintained and a motor having a high reliability can be provided.

Herein, the embodiment used in a polygon mirror motor is basically the same as the structure shown in the above stated spindle motor, and so an explanation thereof will be omitted. The polygon mirror motor structure requires the same high accuracy of rotation as the magnetic disc drive spindle motor structure. Therefore, the polygon mirror motor can employ a structure similar to that of the magnetic disc drive spindle motor structure, and the same operations and effects can be obtained.

As stated above, according to the present invention, in the oil retaining bearing unit structure, since the lubrication oil is supplied to the oil retaining bearing members by utilizing a porous spacer, an adequate bearing lubrication can be supplied even when the bearing unit structure is operated at a high speed of rotation.

Further, since the oil retaining bearing members are manufactured at a low cost and have superior mass productivity, an oil retaining bearing unit having a low cost of manufacture is capable of mass production in a compact size motor.

Further, since a magnetic fluid is employed as the lubrication oil, resulting in a dependable bearing lubrication and an excellent sealing function utilizing a magnetic absorption force produced by a permanent magnet, an oil retaining bearing unit for a motor suitable for use in a clean environment can be provided.

Further, by utilizing a lubrication oil and a magnetic fluid of suitable viscosity, and by utilizing a dynamic pressure bearing structure, an improvement in the reliability of the oil retaining bearing unit and the performance of a motor employing the oil retaining bearing unit can be attained.

We claim:

1. An oil retaining bearing unit comprising:
    a rotative shaft;
    a bearing housing;
    a first oil retaining bearing member located at an upper portion of the bearing housing for rotatively supporting said rotative shaft in said bearing housing;
    a second oil retaining bearing member located at a lower portion of the bearing housing for rotatively supporting said rotative shaft in said bearing housing;
    said first oil retaining bearing member and said second oil retaining bearing member being spaced by an interval;
    a porous spacer inserted closely between said first oil retaining bearing member and said second oil retaining bearing member for supplying lubrication oil; and
    lubrication oil enclosed in said bearing housing in an amount sufficient to allow said porous spacer to dip into said lubrication oil at one end thereof.

2. An oil retaining bearing unit comprising:
    a rotative shaft;
    a bearing housing;
    a first oil retaining bearing member located at an upper portion of the bearing housing for rotatively supporting said rotative shaft in said bearing housing;
    a second oil retaining bearing member located at a lower portion of the bearing housing for rotatively supporting said rotative shaft in said bearing housing;
    said first oil retaining bearing member and said second oil retaining bearing member being spaced by an interval;
    a porous spacer inserted closely between said first oil retaining bearing member and said second oil retaining bearing member for supplying magnetic fluid;
    a ring-shaped permanent magnet arranged on an upper surface of said first oil retaining bearing member; and
    magnetic fluid enclosed in said bearing housing in an amount sufficient to allow said porous spacer to dip into said magnetic fluid at one end thereof.

3. An oil retaining bearing unit according to claim 2, wherein
    said bearing housing is made of a non-magnetic material, and said rotative shaft is made of a high permeability material, whereby
    by a combination of said non-magnetic bearing housing and said high permeability rotative shaft and said ring-shape permanent magnet, said magnetic fluid has a maintenance function and a sealing function.

4. An oil retaining bearing unit according to any one of claim 2 and claim 3, wherein
    the viscosity of said magnetic fluid is 80–120 centipoise at 40° C.

5. An oil retaining bearing unit according to any one of claim 2 and claim 3, wherein
    a viscosity of said magnetic fluid is less than 50 centipoise at 25° C.

6. An oil retaining bearing unit according to claim 1, wherein
    the viscosity of said lubrication oil is 80–120 centipoise at 40° C.

7. An oil retaining bearing unit according to claim 1, wherein
    the viscosity of said lubrication oil is less than 50 centipoise at 25° C.

8. An oil retaining bearing unit according to any one of claim 1 to claim 3, wherein
    said bearing housing comprises a cylindrical body having a bottom portion, one end of said bearing housing is open and another end of said bearing housing is closed; and
    a thrust bearing is arranged on said bottom portion of said cylindrical body of said bearing housing,
    said open end of said bearing housing being arranged at an upper portion and said another end of said bearing housing being arranged at a lower portion.

9. An oil retaining bearing unit according to any one of claim 1 to claim 3, wherein
    at least one passage extending in a rotation axis direction is formed between an inner peripheral face of said bearing housing and said first oil retaining bearing member, and
    at least one passage extending in a rotation axis direction is formed between an inner peripheral face of said bearing housing and said second oil retaining bearing member.

10. An oil retaining bearing unit according to any one of claim 1 to claim 3, wherein
    said first oil retaining bearing member is formed using one material selected from a Fe system material and a Fe—Cu system material, and said second oil retaining bearing member is formed using one material selected from a Fe system material and a Fe—Cu system material.

11. An oil retaining bearing unit according to any one of claim 1 to claim 3, wherein an inner peripheral face of said first oil retaining bearing member is formed as a non-circular shaped dynamic pressure type bearing member, and an inner peripheral face of said second oil retaining bearing member is formed as a non-circular shaped dynamic pressure type bearing member.

12. An oil retaining bearing unit according to any one of claim 1 to claim 3, wherein a pore diameter size of said porous spacer is larger than a pore diameter size of said first oil retaining bearing member, and said pore diameter size of said porous spacer is larger than a pore diameter size of said second oil retaining bearing member.

13. A motor having an oil retaining bearing unit, wherein said oil retaining bearing unit comprises:

a rotative shaft;

a bearing housing;

a first oil retaining bearing member located at an upper portion of said bearing housing for rotatively supporting said rotative shaft in said bearing housing;

a second oil retaining bearing member located at a lower portion of said bearing housing for rotatively supporting said rotative shaft in said bearing housing;

said first oil retaining bearing member and said second oil retaining bearing member being spaced by an interval;

a porous spacer inserted closely between said first oil retaining bearing member and said second oil retaining bearing member for supplying one of lubrication oil and magnetic fluid; and one of lubrication oil and magnetic fluid enclosed in said bearing housing in an amount sufficient to allow said porous spacer to dip into said one of lubrication oil and magnetic fluid at one end thereof.

14. A motor having an oil retaining bearing unit according to claim 13, wherein said oil retaining bearing unit further comprises a ring-shaped permanent magnet arranged on an upper surface of said first oil retaining bearing member.

15. A motor having an oil retaining bearing unit according to claim 14, wherein said magnetic fluid is supplied, said bearing housing is made of a non-magnetic material, and said rotative shaft is made of a high permeability material, whereby by a combination of said non-magnetic bearing housing and said high permeability rotative shaft and said ring-shape permanent magnet, said magnetic fluid has a maintenance function and a sealing function.

16. A motor having an oil retaining bearing unit according to any one of claim 14 and 15, wherein a viscosity of said magnetic fluid is 80–120 centipoise at 40° C.

17. A motor having an oil retaining bearing unit according to any one of claims 14 and 15, wherein the viscosity of said magnetic fluid is less than 50 centipoise at 25° C.

18. A motor having an oil retaining bearing unit according to claim 13, wherein the viscosity of said lubrication oil is 80–120 centipoise at 40° C.

19. A motor having an oil retaining bearing unit according to claim 13, wherein the viscosity of said lubrication oil is less than 50 centipoise at 25° C.

20. A motor having an oil retaining bearing unit according to any one of claims 13, 14 and 15, wherein said bearing housing comprises a cylindrical body having a bottom portion, one end of said bearing housing is open and another end of said bearing housing is closed, and a thrust bearing is arranged on said bottom portion of said cylindrical body of said bearing housing, said open end of said bearing housing being arranged at an upper portion and said another end of said bearing housing being arranged at a lower portion.

21. A motor having an oil retaining bearing unit according to any one of claims 13, 14 and 15, wherein at least one passage extending in a rotation axis direction is formed between an inner peripheral face of said bearing housing and said first oil retaining bearing member, and at least one passage extending in a rotation axis direction is formed between an inner peripheral face of said bearing housing and said second oil retaining bearing member.

22. A motor having an oil retaining bearing unit according to any one of claims 13, 14 and 15, wherein said first oil retaining bearing member is formed using one material selected from a Fe system material and a Fe—Cu system material, and said second oil retaining bearing member is formed using one material selected from Fe system material and a Fe—Cu system material.

23. A motor having an oil retaining bearing unit according to any one of claims 13, 14 and 15, wherein an inner peripheral face of said first oil retaining bearing member is formed as a non-circular shaped dynamic pressure type bearing member, and an inner peripheral face of said second oil retaining bearing member is formed as a non-circular shaped dynamic pressure type bearing member.

24. A motor having an oil retaining bearing unit according to any one of claims 13, 14 and 15, wherein a pore diameter size of said porous spacer is larger than a pore diameter size of said first oil retaining bearing member, and said pore diameter size of said porous spacer is larger than a pore diameter size of said second oil retaining bearing member.

25. A motor having an oil retaining bearing unit according to any one of claims 13, 14 and 15, wherein said motor is one of a compact disk drive motor, a magnetic disk drive motor and a polygon mirror motor.

* * * * *